March 15, 1966 A. BRUNNER 3,240,188
METHOD OF AND APPARATUS FOR DISTRIBUTING A FLUID
INTO AT LEAST TWO HEATED TUBES ARRANGED IN
PARALLEL RELATION WITH RESPECT TO THE
FLOW OF FLUID THERETHROUGH
Filed Oct. 4, 1962 4 Sheets-Sheet 2

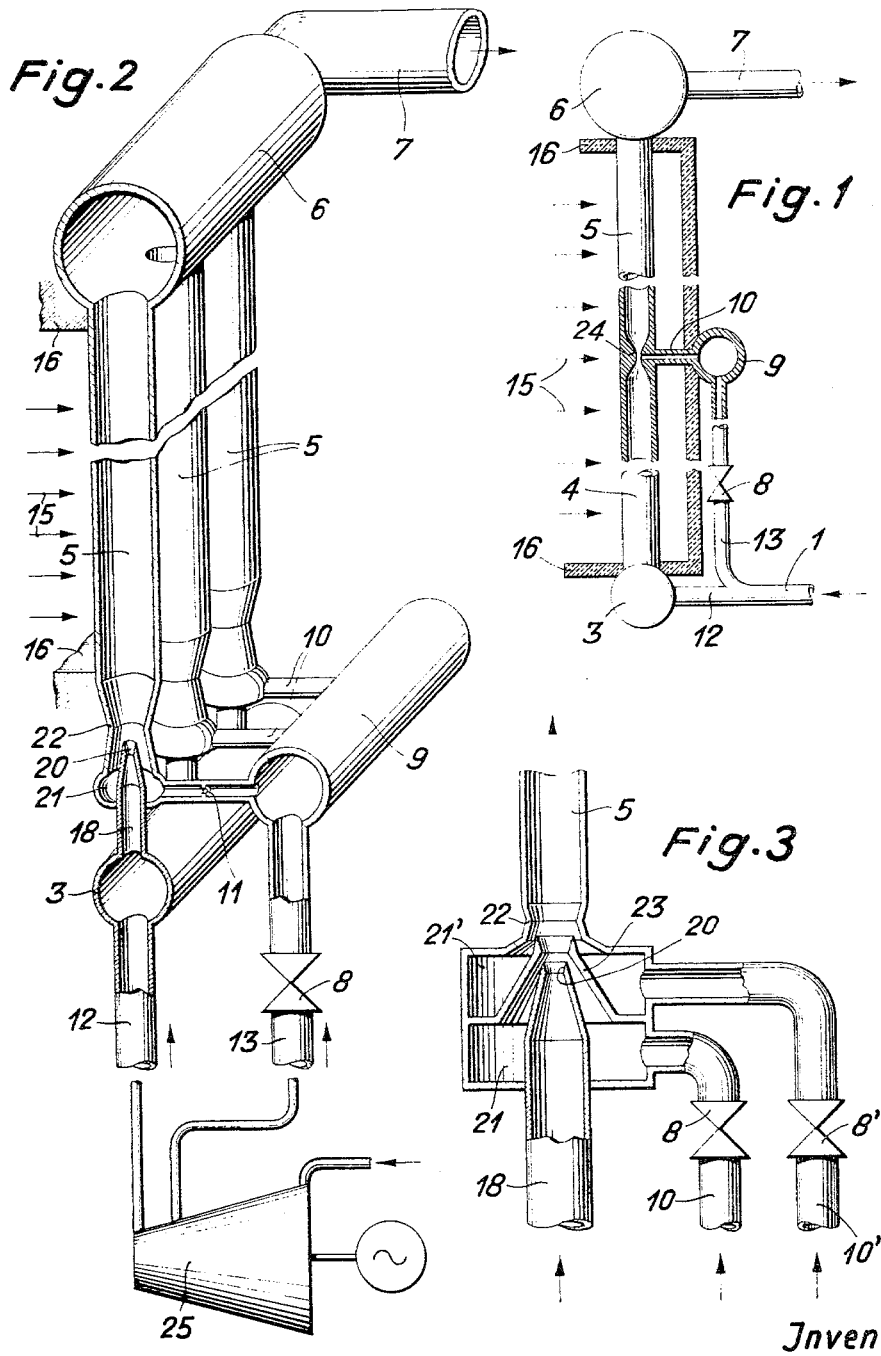

Inventor:
ALFRED BRUNNER
By K. H. Meyr
ATTORNEY.

United States Patent Office 3,240,188
Patented Mar. 15, 1966

3,240,188
METHOD OF AND APPARATUS FOR DISTRIBUTING A FLUID INTO AT LEAST TWO HEATED TUBES ARRANGED IN PARALLEL RELATION WITH RESPECT TO THE FLOW OF FLUID THERETHROUGH
Alfred Brunner, Winterthur, Switzerland, assignor to Sulzer Freres, S.A., Winterthur, Switzerland, a corporation of Switzerland
Filed Oct. 4, 1962, Ser. No. 228,485
Claims priority, application Switzerland, Oct. 6, 1961, 11,630/61
10 Claims. (Cl. 122—407)

The invention relates to a method of and apparatus for distributing a fluid into at least two heated tubes which are arranged in parallel relation with respect to the flow of fluid therethrough. Each tube is connected via a throttling device to a first or main distributor or inlet header for supplying a fraction of the amount of fluid which may be heated in the tubes. Each tube is connected also to a second or additional distributor or inlet header for supplying an additional amount of fluid to the tubes, the maximum total amount of fluid supplied in this manner corresponding to maximum amount of fluid which may be heated in the tubes. The distributors are connected by conduits to an extraneous source of supply of operating fluid independent of the apparatus for distributing the fluid.

In the apparatus according to the invention the throttling devices in the connections of the tubes to the first or main distributor are in the form of ejectors which are also connected to the connection of the tubes to the second or additional distributor for drawing additional fluid therefrom into the tubes. This arrangement makes it possible to maintain in the first or main distributor which supplies fluid when the tubes are operated at full load as well as when they are operated at partial load, a higher pressure than in the additional distributor which supplies the additional fluid required for full load operation. In this way pressure energy can be saved or the operating fluid additionally supplied to satisfy high load conditions can be additionally throttled for improving the flow stability in the parallel connected and heated tubes also at high load operation.

The apparatus according to the invention is particularly suitable in connection with forced flow steam generators wherein the heated tubes form evaporating tubes and the conduits connecting the distributors and the ejectors may form an economizer heating surface. The latter may also be formed by the conduit supplying feedwater to one of the distributors and/or by the conduit supplying feedwater to the second distributor.

It is an object of the present invention to improve the operation of forced flow steam generators wherein the operating medium is heated in a plurality of tubes which are arranged in parallel relation with respect to the flow of the operating medium therethrough.

In the method according to the invention operating fluid of a forced flow steam generator is conducted from a first feed pipe through a first header into tubes which are heated for heating the fluid therein; the flow of operating medium through the tubes is throttled at a predetermined location in the tubes and operating fluid is conducted from a second feed pipe through a second header into the tubes at said predetermined locations, when the steam generator is operated above a predetermined load. When the steam generator operates below this load no operating medium is supplied from the second feed pipe. In this way an equal distribution of the operating fluid into the tubes is obtained without unduly increasing the pressure drop in the tubes and without undue blow-down waste.

The novel features which are considered characteristic of the invention are set forth with particularity in the the appended claims. The invention itself, however, and additional objects and advantages thereof will best be understood from the following description of embodiments thereof when read in connection with the accompanying drawing wherein:

FIG. 1 is a part-sectional schematic illustration of an arrangement according to the invention.

FIG. 2 is a diagrammatic part-sectional perspective illustration of a modified arrangement according to the invention.

FIG. 3 is a diagrammatic part-sectional illustration of a modified detail of the arrangement shown in FIG. 2.

Equivalent parts are designated by like numerals in the several figures.

Figure 4:
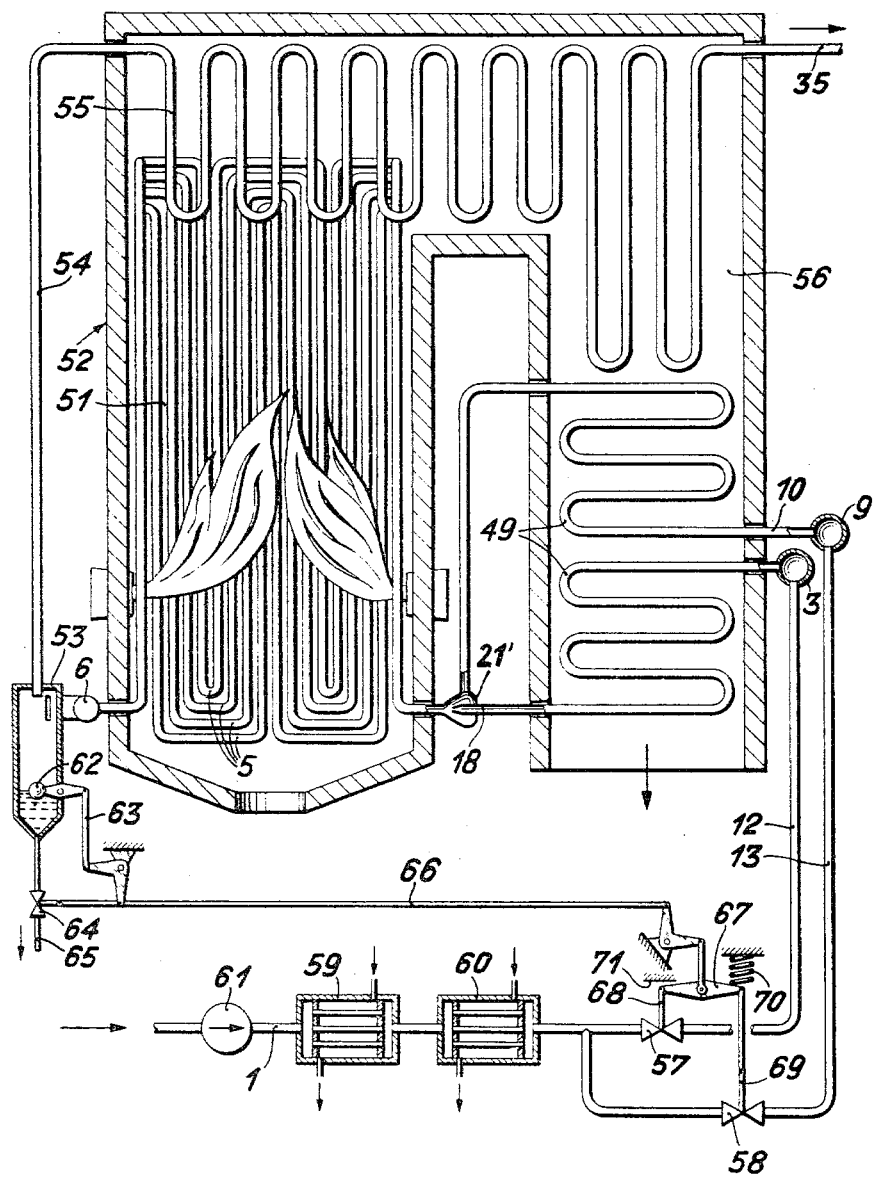
FIG. 4 is a diagrammatic vertical sectional view of a forced flow steam generator embodying the system according to the invention.

Referring more particularly to FIG. 1 of the drawing, numeral 1 designates a feed pipe which continues into two pipes 12 and 13. The pipe 12 is connected to an inlet header 3 and the pipe 13 which is provided with a valve 8 is connected to an inlet header 9. A plurality of tubes 4 are connected to the header 3 to receive fluid therefrom. The tubes 4 are heated for heating the fluid flowing therein and continue into tubes 5 which are also heated and which are connected to a collector 6. The fluid collected therein is discharged into a pipe 7. Arrows 15 in FIG. 1 represent heating medium flowing across the tubes 4, 5. At the transition from the tube 4 to the tube 5 a restriction 24 is provided for throttling the fluid flowing from the tube 4 into the tube 5. Each tube 4, 5 is connected to the header 9 by means of a pipe 10 which terminates in the restriction 24. Throttling orifices whose diameter may be adjustable may be inserted into the pipes 10. The headers 3 and 9 and the collector 6 are shielded from the heat flowing in the direction of the arrows 15.

When the apparatus is operated at partial load the valve 8 is closed and operating medium flows from the feed pipe 1 through the pipe 12 into the header 3 which distributes the operating medium into the tubes 4, 5. There is a pressure drop at the restrictions 24 so that the flow of the operating medium through the tubes 5 is stable. At a load exceeding a predetermined partial load the valve 8 is opened and additional operating medium is drawn through the pipes 10 from the header 9 which is supplied with operating medium through the pipe 13. The additional operating medium is mixed with the operating medium leaving the tube 4. There is a relatively low pressure within the restrictions 24 and in the tubes 5. The pressure inside the pipes 10 is equally low.

The valve 8 may be of the on and off type, i.e., is opened either fully open or fully closed. The valve 8 may also be of a type which can be gradually closed and opened and held in any desired intermediate position.

The example of the invention shown in FIG. 2 comprises a plurality of tubes 5 corresponding to the tubes 5 in FIG. 1 and heated by a heating agent flowing in the direction of the arrows 15. The tubes 5 terminate in a collector 6 to which a discharge pipe 7 is connected. The inlets of the tubes 5 form ejectors. Into the inlet of each tube 5 extends a pipe 18 having an upper end forming a nozzle 20, all pipes 18 being connected to a distributor or inlet header 3 to receive fluid therefrom. The lower ends of the tubes 5 are so shaped as to form spaces 21 around the nozzles 20 which spaces are connected by means of pipes 10 provided with throttling orifices 11 to a header 9. The upper ends of the nozzles 20 are surrounded by tube portions whose flow area is gradually reduced and which connect the spaces 21 with the tubes 5 through a restriction 22 which is slightly beyond the nozzles 20. The header 3 is connected by means of a pipe 12 to the highest pressure stage of a feed pump 25. The header 9 is connected by a feed pipe 13 provided with a valve 8 to an intermediate pressure stage of the feed pump 25.

When the heating apparatus is operated at low load operating medium flows from the pipe 12 into the header 3 and therefrom through the pipes 18 into the tubes 5. The pressure drop necessary to effect the desired flow stability in the tubes 5 is produced by the nozzles 20. At increasing load the valve 8 which was closed during low load operation, is opened so that additional operating medium is drawn through the pipes 10 from the header 9. The embodiment of the invention shown in FIG. 2 has the advantage that the pressure drop required for stabilizing the flow of the fluid in the tubes 5 is partly recovered by the suction action which supplies additional operating medium. Therefore, the header 9 which is only used at relatively great loads may be connected to an intermediate pressure stage of the feed pump 25.

The valve 8 may be controlled in response to the load or to the desired output of the heating apparatus. Instead of providing nozzles 20 in the center of the inlets of the tubes 5 for discharging fluid thereinto the fluid from the header 3 may be discharged through annular spaces into the tubes 5 and the additional fluid drawn from the pipes 10 may be conducted into the center of the annular spaces. Provision of pipes 10 of suitable length and/or having suitable flow areas, or of suitable ejector flow areas may permit omission of the throttling orifices 11.

FIG. 3 is a diagrammatic illustration of an ejector arrangement at the inlet of a tube 5 whereby operating fluid is supplied from three different sources. As in the example shown in FIG. 2 a fluid supply pipe 18 terminates in a nozzle 20 which is surrounded by a space 21 in which a pipe 10 provided with a valve 8 terminates. The outlet of the space 21 is formed by a conical wall 23 to form a nozzle which is surrounded by a space 21' to which a third supply pipe 10' provided with a valve 8' is connected. The space 21' terminates in a restricted area 22 at the inlet of the tube 5 and adjacent to the nozzle formed by the outlet of the conical wall 23.

At minimum load operating medium flows through the central supply pipes 18 which are connected to a distributor, not shown. Upon increasing demand of heated fluid the valve 8 is opened so that additional operating medium is drawn from the pipe 10. At maximum load the valve 8' is opened so that additional operating medium is drawn from the pipe 10' by the additional operating medium flowing through the nozzlelike outlet of the conical wall 23.

FIG. 4 illustrates the application of the invention to a forced flow steam generator 52 having evaporating tubes 5 which line the walls of a combustion chamber 51. The tubes 5 terminate in a collector 6. A steam separator 53 is connected to the collector 6 to receive operating medium therefrom. To the steam space of the separator 53 is connected a pipe 54 which conducts the separated steam into a superheater 55 which is placed in the upper part of the combustion chamber 51 and extends through a part of a flue 56. The superheated steam leaves the superheater 55 through a live steam pipe 35 which may be connected to a steam turbine, not shown. An economizer 49 is placed in the lower part of the flue 56. The economizer is formed by pipes 10 connected to an inlet header 9 and by pipes 18 connected to a main inlet header 3. The header 3 is supplied with feedwater through a pipe 12 provided with a valve 57 and the additional inlet header 9 is supplied with feedwater through a pipe 13 provided with a valve 58. The pipes 18 terminate nozzlelike in pear-shaped housings 21'. The narrow ends of the housings 21' are individually connected to evaporator tubes 5. The pipes 10 terminate in the wide portion of the pear-shaped housings 21'.

A feed pipe 1 supplied with feedwater by means of a pump 61 is provided with two consecutive steam-heated preheaters 59 and 60 for preheating the feedwater before it is distributed into the pipes 12 and 13. The separator 53 is provided with a float 62 which actuates through a linkage 63 a valve 64 in a blowdown pipe 65. To the linkage 63 a linkage 66 is connected which actuates a two-arm lever 67. One arm of the latter is connected by a connecting rod 68 to the valve 57 and the second arm of the lever 67 is connected by a suitable linkage 69 to the valve 58. The linkage 69 rests on a spring 70.

In the position of the linkages 63, 66 shown in FIG. 4 the steam generator operates at about 40% of its rated output. Only the valve 57 is open and operating medium flows through the pipe 12 into the header 3. The operating medium flows from the latter through pipes 18 forming the lower part of the heating surface of the economizer 49. The flow resistance of the pipes 18 is such that there is sufficient pressure drop for preventing flow instabilities in the evaporator tubes 5. At increasing load the linkages 63 and 66 move to open the valve 57 until the left end of the lever 67 abuts against a stationary abutment 71. If the load continues to increase to about 50% of the full load the valve 58 is opened and additional feedwater is supplied through the pipe 13 to the header 9 and therefrom into the pipes 10 forming the upper part of the heating surface of the economizer 49. The ejector action of the nozzlelike ends of the pipes 18 in the pear-shaped housings 21 draws operating medium from the pipes 10.

The division of the economizer 49 into two parts and operation of only one part at partial load of the steam generator has the advantage that the flue gases are less cooled when operating at partial load whereby dew-point corrosion of the economizer heating surface is avoided.

Instead of controlling the valves 57 and 58 in response to the water level in the separator 53 these valves may be controlled in response to other operating conditions, for example, in response to the load which is indicated by the rate of flow of the feedwater in the pipe 1 or in response to the rate at which fuel is supplied to the steam generator. Controls of this kind are disclosed in the patent application of Fritz Läubli, Serial No. 172,449, filed February 12, 1962 and in the patent application of Paul Profos, Serial No. 132,876, filed August 21, 1961.

Figure 5:
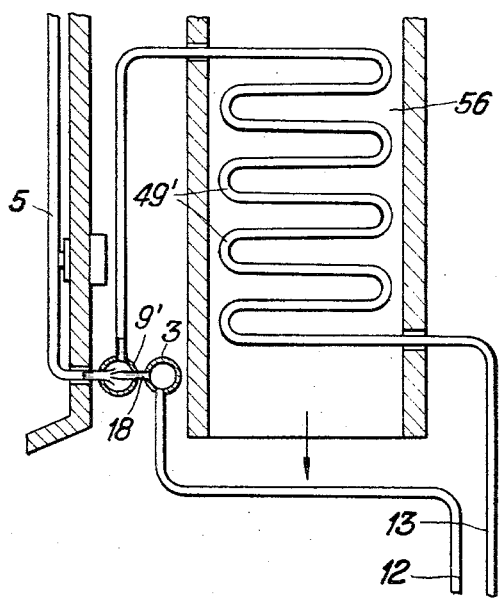
FIG. 5 is a diagrammatic sectional view of another modification of the system according to the invention.

In the modification shown in FIG. 5 the pipe 13 forms the heating surface of an economizer 49' and terminates in a header 9'. The pipe 12 terminates in a header 3 without being heated. Evaporating tubes 5 are connected to the header 9'. For each evaporating tube 5 a pipe 18 is connected to the header 3 and extends into the header 9'. The ends of the pipes 18 form nozzles individually extending into the widened inlets of the tubes 5. Additional fluid is drawn from the header 9' into the tubes 5 by the ejector effect of the ends of the pipes 18 which extend into the widened inlets of the tubes 5.

Figure 6:
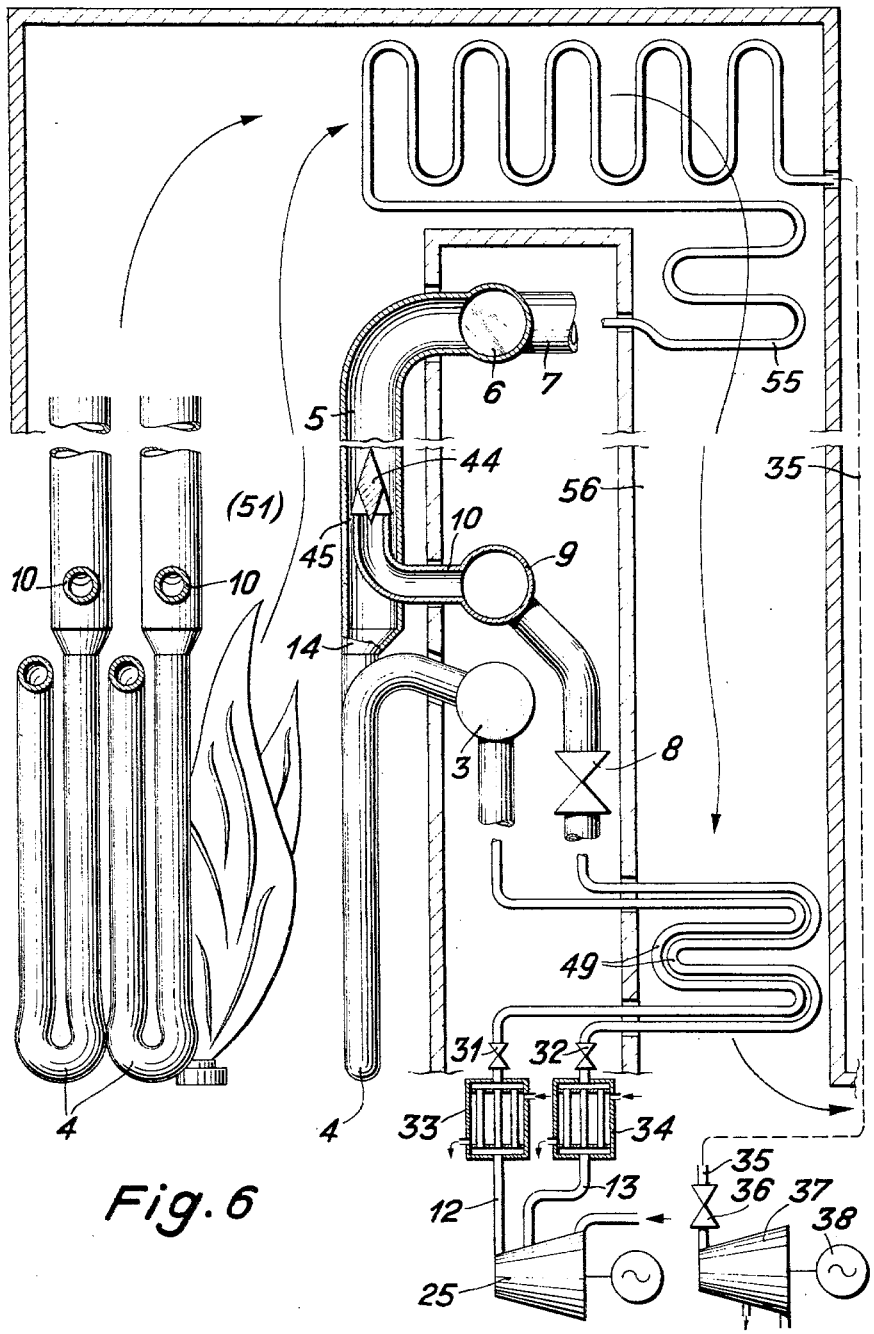
FIG. 6 is a diagrammatic part-sectional view of a portion of a forced flow steam generator embodying a modification of the system according to the invention.

In the arrangement shown in FIG. 6 the pipe 12 is connected to the highest pressure stage of a feed pump 25 and the pipe 13 is connected to an intermediate pressure stage of the feed pump 25. The pipes 12 and 13 have portions forming the heating surface of an economizer 49 placed in a flue gas duct 56. A steam-heated preheater 33 is interposed in the pipe 12 upstream of a feedwater control valve 31 and a steam-heated preheater 34 is interposed in the pipe 1 upstream of a feedwater control valve 32. The pipe 12 terminates in a header 3 and the pipe 13 terminates in a header 9. A plurality of tubes 4 is connected to the header 3 which tubes extend downward along a wall of a combustion chamber 51, form a U-bend and extend upward to a location 14 where the diameter of the tubes 4 increases to form ejectors with pipes 10 connected to the header 9 and ending in the centers of tubes 5 connected to the upper ends of the tubes 4. A restricting body 44 is placed at the end of each pipe 10 inside a tube 5. This body has the general configuration of a double cone having radial wings connected to the lower cone and connected to the end of the tube 10, for example, by welding. The operating medium flowing through an annular space 45 between the inside of tube 5 and the coaxial end portion of the pipe 10 produces a suction effect for drawing additional feedwater out of the pipe 10. The tubes 5 run along a wall of the combustion chamber 51 and terminate in a collector 6 to which a pipe 7 is connected forming a superheater 55. The outlet of the latter is connected by a conduit 35 indicated by a dotted line and containing a valve 36 to a turbine 37 which drives an electric generator 38. The headers 3 and 9, the collector 6, and the connected parts 4, 14, 10 and 5 are shown in much larger scale in FIG. 6 than the other parts of the plant shown therein to make the showing more clear.

Below a predetermined partial load operating medium flows only through the pipe 12 and the header 3 into the evaporating tubes 4, 5. When the steam generator is operated above a predetermined partial lead the valve 8 is opened and operating medium flows also through the pipe 13 and the header 9 and through the pipes 10 into the ejector formed inside the tube 5. When the arrangement according to FIG. 6 is operated at partial load only a part of the heating surface of the economizer 49 is cooled so that the flue gases are less cooled whereby dewpoint corrosion of the economizer tubes is avoided.

I claim:
1. A forced flow stream generator comprising:
   at least two tubes conducting operating medium of the steam generator and arranged in parallel relation with respect to the flow of the operating medium through said tubes,
   means for heating said tubes,
   a main inlet header,
   a first feedwater supply pipe connected to said main inlet header,
   at least one additional header,
   a second feedwater supply pipe connected to said additional header,
   said first and second feedwater supply pipes being connected at opposite ends thereof to a common fluid supply source and being arranged in parallel relation with respect to each other,
   conduit means interconnecting said headers and said tubes,
   said conduit means including throttling means forming ejectors for throttling the operating medium of the steam generator coming from said main header and for drawing additional operating medium from said additional header into said tubes,
   a means responsive to the load on the steam generator,
   a valve in each of said feedwater supply pipes, and actuating means operatively connected to said valves and to said load responsive means for opening said valve in said first feedwater supply pipe upon rising load and subsequently opening said valve in said second feedwater supply pipe upon continued rising of the load on the steam generator, and conversely.

2. A forced flow steam generator comprising:
   at least two tubes conducting operating medium of the steam generator and arranged in parallel relation with respect to the flow of the operating medium of the steam generator through said tubes,
   means for heating said tubes,
   a main inlet header,
   a first feedwater supply pipe connected to said main inlet header,
   at least one additional header,
   a second feedwater supply pipe connected to said additional header,
   said first and second feedwater supply pipes being connected at opposite ends thereof to a common fluid supply source and being arranged in parallel relation with respect to each other,
   conduit means interconnecting said headers and said tubes,
   said conduit means including throttling means forming ejectors for throttling the feedwater coming from said main header and for drawing additional feedwater from said additional header into said tubes,
   an outlet header connected to said tubes,
   a water separator connected to said outlet header,
   a valve in each of said feedwater supply pipes,
   water level responsive means operatively connected to said water separator, and
   actuating means operatively connected to said valves and to said water level responsive means for opening said valve in said feedwater supply line connected to said main inlet header upon falling water level in said separator due to increasing load and subsequently opening said valve in said feedwater supply pipe connected to said additional header upon continued falling water level, and conversely.

3. A combination of a common fluid supply source and an apparatus for heating a fluid from said supply source, said heating apparatus having at least two tubes arranged in parallel relation with respect to the flow of fluid through said tubes, means for heating said tubes, a main inlet header, a first fluid supply pipe connected to said main inlet header, at least one additional header, a second fluid supply pipe connected to said additional header, said first and second fluid supply pipes being connected at opposite ends thereof to said supply source and being arranged in parallel relation with respect to each other, and conduit means extending from said main header into said additional header and individually into said tubes, said conduit means forming ejectors inside said additional header for throttling the fluid coming from said main header and for drawing additional fluid from said additional header into said tubes.

4. A combination of a common operating medium supply source and a forced flow steam generator, said forced flow steam generator having at least two tubes for conducting operating medium arranged in parallel relation with respect to the flow of operating medium therethrough, means for heating said tubes, a main inlet header, a first feedwater supply pipe connected to said main inlet header, at least one additional header, a second feedwater supply pipe connected to said additional header and including means for controlling the rate of supply of feedwater thereto, said first and second feedwater supply pipes being connected at opposite ends thereof to said common supply source in parallel relation with respect to each other, and conduit means interconnecting said headers and said tubes, said conduit means including throttling means forming ejectors for throttling the feedwater coming from said main inlet header and for drawing additional feedwater from said additional header into said tubes.

5. A combination as set forth in claim 4 wherein said common operating medium supply source includes a multi-stage pump and wherein said first feedwater supply pipe is connected to a high pressure stage of said pump and said second feedwater supply pipe is connected to a low pressure stage of said pump.

6. A method of heating operating fluid in a forced flow steam generator, comprising:
   conducting operating fluid from a common supply source independent of said steam generator through a first feed pipe into a first header and therefrom into a plurality of tubes which are arranged in parallel relation with respect to the flow of operating fluid therethrough, throttling the flow of operating fluid at a predetermined location in said tubes, heating said tubes, and conducting additional operating fluid at variable rates of flow simultaneously from said supply source through a second feed pipe connected in parallel with the first feed pipe to said supply source into a second header and therefrom into said tubes at said predetermined locations, when the steam generator is operated above a predetermined load.

7. A method as defined in claim 6 wherein said feed pipes are heated.

8. A method as defined in claim 6 wherein one of said feed pipes is heated.

9. A method as defined in claim 6 wherein the operating fluid is heated while flowing from said first header and from said second header into said tubes.

10. A method as defined in claim 6 wherein the operating fluid is heated while flowing from one of said headers into said tubes.

References Cited by the Examiner

UNITED STATES PATENTS

| | | | |
|---|---|---|---|
| 1,940,663 | 12/1933 | Coutant | 122—407 |
| 2,255,612 | 9/1941 | Dickey | 122—406 |
| 2,324,513 | 7/1943 | Junkins | 122—451 |
| 2,704,534 | 3/1955 | Dalin et al. | 122—407 |
| 2,800,887 | 7/1957 | Profos | 122—448 |
| 3,103,918 | 9/1963 | Huet | 122—407 |

FOREIGN PATENTS

| | | |
|---|---|---|
| 8,733 | 1904 | Great Britain. |
| 497,748 | 12/1938 | Great Britain. |

FREDERICK, L. MATTESON, JR., *Primary Examiner.*

KENNETH W. SPRAGUE, PERCY L. PATRICK,
*Examiners.*